United States Patent
Lin

(10) Patent No.: US 12,277,021 B2
(45) Date of Patent: Apr. 15, 2025

(54) CIRCUITRY THAT CAN PERFORM FAST MODE SWITCHING

(71) Applicant: Realtek Semiconductor Corp., HsinChu (TW)

(72) Inventor: Pin-Hung Lin, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 117 days.

(21) Appl. No.: 17/992,863

(22) Filed: Nov. 22, 2022

(65) Prior Publication Data
US 2023/0221788 A1   Jul. 13, 2023

(30) Foreign Application Priority Data
Jan. 10, 2022  (TW) .................................. 111100894

(51) Int. Cl.
  *G06F 1/3296*    (2019.01)
  *G06F 13/10*     (2006.01)

(52) U.S. Cl.
  CPC .......... *G06F 1/3296* (2013.01); *G06F 13/102* (2013.01)

(58) Field of Classification Search
  CPC .... G06F 1/3296; G06F 13/102; G06F 1/3203; G06F 1/3234; G06F 1/3265; G09G 5/006; G09G 2330/022; G09G 2330/026; G09G 2330/027; G09G 2370/04; G09G 2370/10
  See application file for complete search history.

(56) References Cited

U.S. PATENT DOCUMENTS

| | | | | |
|---|---|---|---|---|
| 2008/0250365 | A1* | 10/2008 | Chou | G01R 31/318536 716/106 |
| 2011/0087805 | A1* | 4/2011 | Liu | G06F 13/4081 710/14 |
| 2011/0176465 | A1* | 7/2011 | Panta | H04W 52/0235 370/311 |
| 2018/0068412 | A1* | 3/2018 | Schnell | G06F 13/4068 |
| 2022/0268837 | A1* | 8/2022 | Leong | G01R 31/2849 |

\* cited by examiner

*Primary Examiner* — Brian T Misiura
(74) *Attorney, Agent, or Firm* — Winston Hsu

(57) ABSTRACT

A circuitry includes a multi-mode switching multiplexer, a control circuit and a receiver. The multi-mode switching multiplexer is arranged to receive multiple mode settings, and select one of the multiple mode settings as an output mode setting. The control circuit is arranged to generate a mode switching signal to control the multi-mode switching multiplexer. The receiver is arranged to set its internal components according to the output mode setting.

9 Claims, 5 Drawing Sheets

CIRCUITRY THAT CAN PERFORM FAST MODE SWITCHING

BACKGROUND OF THE INVENTION

1. Field of the Invention

The present invention is related to a technique for fast mode switching, and more particularly, to a circuitry that can perform fast mode switching.

2. Description of the Prior Art

In related specification of Displayport (DP), an advanced link power management (ALPM) is provided, which requires a display device to be able to quickly leave a sleeping mode for entering subsequent modes. Since the above-mentioned modes involve the control of hardware components, and different modes require different setting configurations for component control, generally after determining to switch to a different mode, the display device transmits control signals corresponding to different modes to the receiver to control the components therein through firmware. However, the above-mentioned method of processing through the firmware is time-consuming, thus affecting the speed of mode switching.

SUMMARY OF THE INVENTION

It is therefore one of the objectives of the present invention to provide a circuitry that can perform fast mode switching, to address the above-mentioned problems.

According to an embodiment of the present invention, a circuitry is provided. The circuitry may include a multi-mode switching multiplexer, a control circuit and a receiver. The multi-mode switching multiplexer may be arranged to receive multiple mode settings, and select one of the multiple mode settings as an output mode setting. The control circuit may be arranged to generate a mode switching signal to control the multi-mode switching multiplexer. The receiver may be arranged to set its internal components according to the output mode setting.

One of the benefits of the present invention is that, in the circuitry of the present invention, by utilizing the multi-mode switching multiplexer to receive multiple mode settings from the firmware at power-on, during the subsequent mode switching, the appropriate mode setting may be generated and output to the receiver for component settings only through the processing of the hardware, without involving the control of the firmware. As a result, the purpose of fast mode switching can be achieved.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
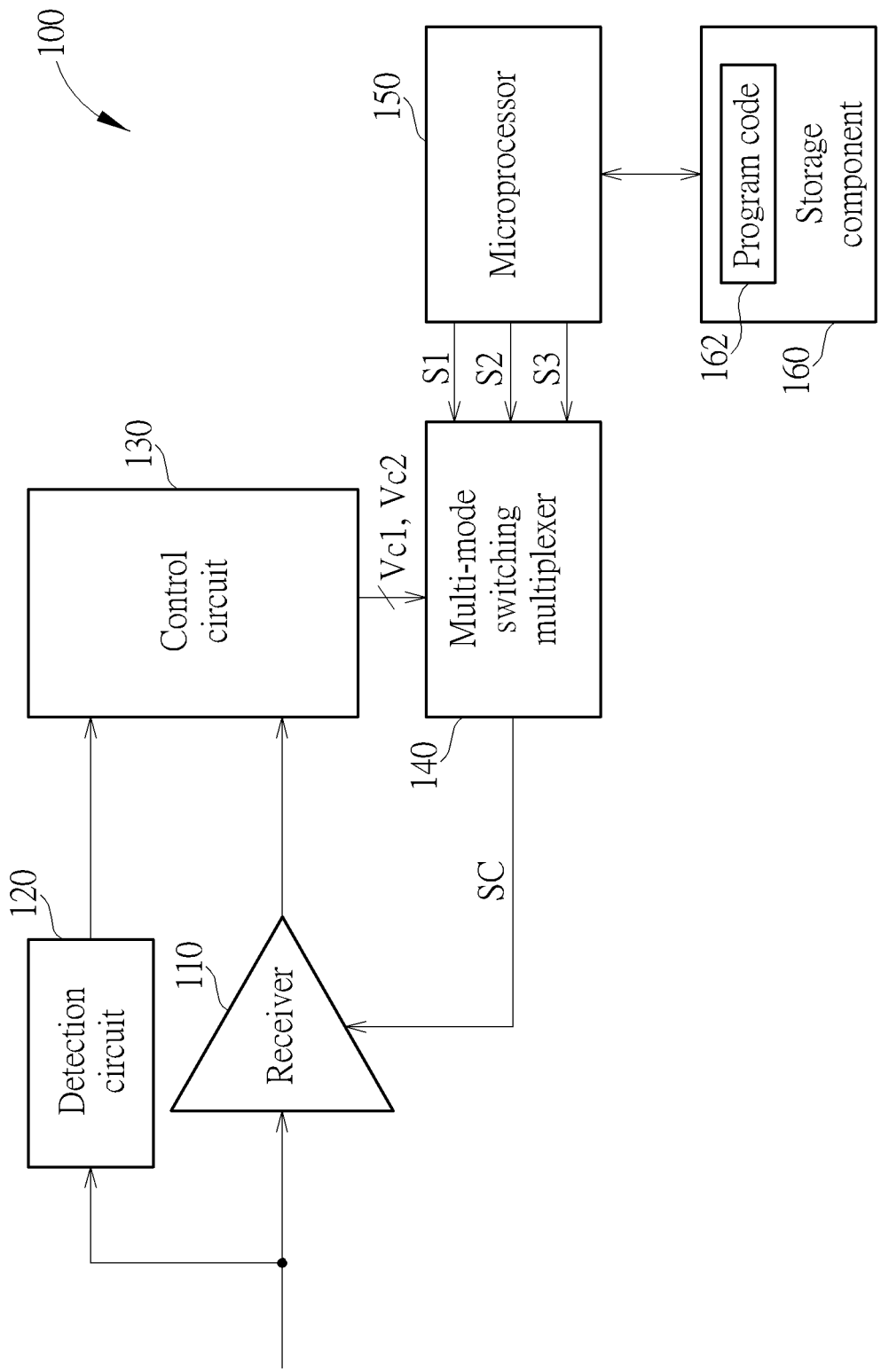
FIG. 1 is a diagram illustrating a circuitry according to an embodiment of the present invention.

FIG. 1 is a diagram illustrating a circuitry 100 according to an embodiment of the present invention. As shown in FIG. 1, the circuitry 100 may include a receiver 110, a detection circuit 120, a control circuit 130, a multi-mode switching multiplexer 140, a microprocessor 150, and a storage component 160, wherein the storage component 160 may include a program code 162. In this embodiment, the circuitry 100 is disposed in a receiving terminal of a display. The circuitry 100 supports a Displayport (DP) specification, and the circuitry 100 may be arranged to receive a DP signal and perform subsequent processing upon the DP signal.

The circuitry 100 may operate at multiple different modes. In the different modes, the receiver 110 may have different setting configurations. In this embodiment, the circuitry 100 may operate at three different modes. When the circuitry 100 operates at a first mode, the receiver 100 will utilize a mode setting S1 to configure the settings of internal components. When the circuitry 100 operates at a second mode, the receiver 110 will utilize a mode setting S2 to configure the settings of internal components. When the circuitry 100 operates at a third mode, the receiver 100 will utilize a mode setting S3 to configure the settings of internal components. Each of the mode settings S1-S3 may include multiple different control bits/control signals. To make the receiver 110 be able to quickly obtain the required mode setting S1/S2/S3 for configuring the settings of internal components when the mode is switched, three mode settings S1, S2, and S3 will be generated and transmitted to the multi-mode switching multiplexer 140 after the microprocessor 150 executes the program code 162 (i.e. firmware, or called software), and the three mode settings S1, S2, and S3 will be written into input terminals of the multi-mode switching multiplexer 140. When the circuitry 100 is required to perform mode switching, the control circuit 130 will generate and transmit mode switching signals Vc1 and Vc2 to the multi-mode switching multiplexer 140, so that the multi-mode switching multiplexer 140 may directly select one of the mode settings S1, S2, and S3 as an output mode setting SC for the receiver 110.

In this embodiment, since the three mode settings S1, S2, and S3 are directly written into the input terminals of the multi-mode switching multiplexer 140 through the firmware, and the three mode settings S1, S2, and S3 will keep existing in the input terminals of the multi-mode switching multiplexer 140 during the operation process of the circuitry 100, when the circuitry 100 is required to switch to a different mode (e.g. switch from the first mode to the second mode), the control circuit 130 may generate the mode switching signals Vc1 and Vc2 to directly control the multi-mode switching multiplexer 140 to output a different mode setting, without outputting the different mode setting according to the mode switching by the microprocessor 150. As mentioned above, in this embodiment, since the operation of outputting a different mode setting S1/S2/S3 during mode switching only needs to be completed through a hardware circuit without the intervention of firmware, the purpose of fast mode switching can be achieved.

In an embodiment, the circuitry 100 is disposed in a display. When the display is turned on and the circuitry 100 is powered on, the microprocessor 150 will write the mode settings S1, S2, and S3 into the input terminals of the multi-mode switching multiplexer 140, even if the circuitry 110 does not need to operate at any of the above-mentioned first mode, second mode, and third mode at that time. In this way, in the subsequent operations of the circuitry 100, the microprocessor 150 does not need to spend any more time writing the mode settings S1, S2, and S3 into the multi-mode switching multiplexer 140.

Figure 2:
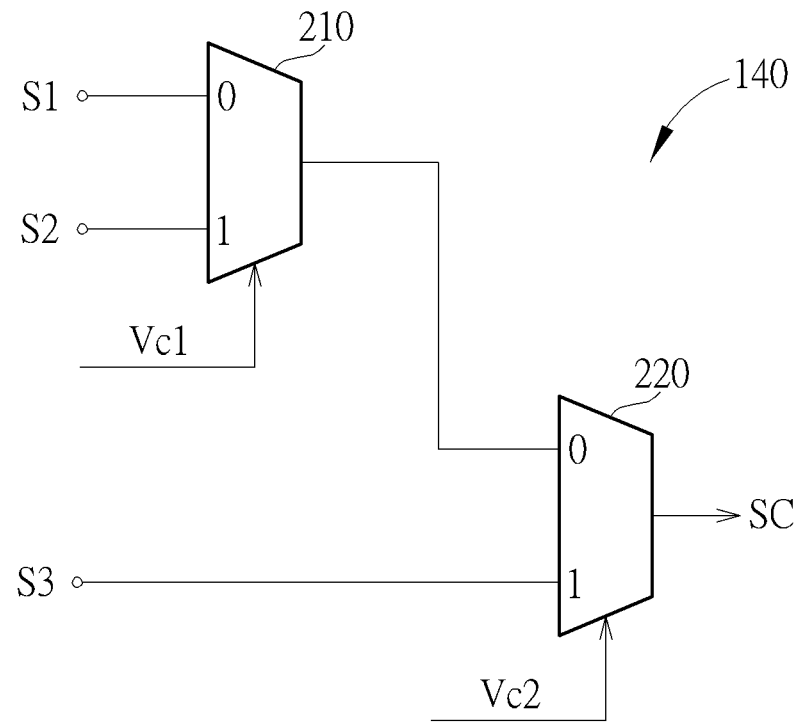
FIG. 2 is a diagram illustrating the multi-mode switching multiplexer and a corresponding timing diagram according to an embodiment of the present invention.
Figure 2:
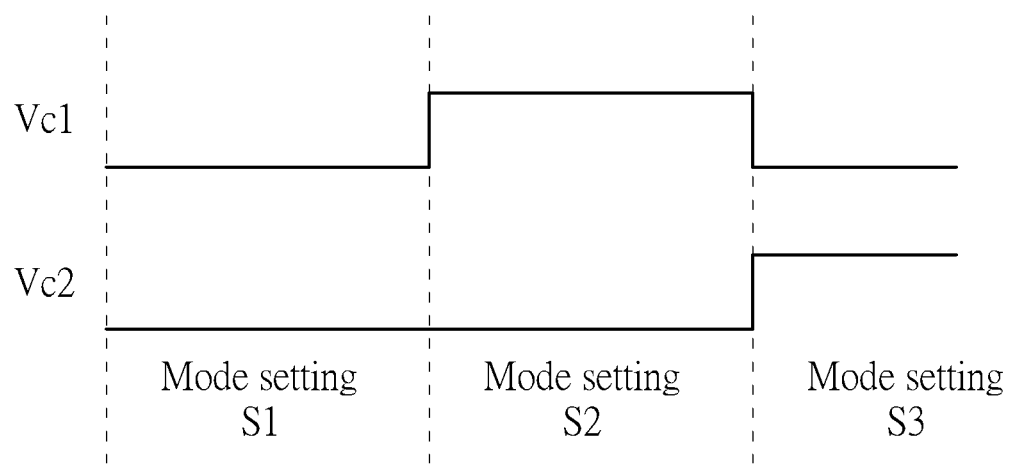

FIG. 2 is a diagram illustrating the multi-mode switching multiplexer 140 and a corresponding timing diagram according to an embodiment of the present invention. As shown in FIG. 2, the multi-mode switching multiplexer 140 may include multiplexers 210 and 220, wherein the multiplexer 210 receives the mode settings S1 and S2, and selects one of the mode settings S1 and S2 according to the mode switching signal Vc1 for outputting a selected mode setting from the multiplexer 210; the multiplexer 220 receives the mode setting S3 and an output of the multiplexer 210, and selects one of the mode setting S3 and the output of the multiplexer 210 according to the mode switching signal Vc2 for outputting a selected mode setting the multiplexer 220. For example, when both of the mode switching signals Vc1 and Vc2 are low voltage levels, the multi-mode switching multiplexer 140 selects the mode setting S1 as the output mode setting SC; when the mode switching signals Vc1 and Vc2 are a high voltage level and a low voltage level, respectively, the multi-mode switching multiplexer 140 selects the mode setting S2 as the output mode setting SC; and when the mode switching signal Vc2 is a high voltage level, the multi-mode switching multiplexer 140 selects the mode setting S3 as the output mode setting SC. It should be noted that, the mode switching signals Vc1 and Vc2 and corresponding mode settings are for illustration only, and are not meant to be limitations of the present invention.

In an embodiment, the aforementioned first mode, second mode, and third mode of the circuitry 100 are a sleeping mode, a wake-up mode, and a receiving mode, respectively, and the mode settings S1, S2, and S3 shown in FIG. 1 and FIG. 2 correspond to the sleeping mode, the wake-up mode, and the receiving mode, respectively. Specifically, regarding the circuitry 100 entering the sleeping mode, the transmitting terminals external to the circuitry 100 will transmit data with sleeping information to the receiver 110, and the receiver 110 then transmits received data to the control circuit 130 for interpretation. If the control circuit 130 determines that the received data indicates to enter the sleeping mode, the control circuit 130 will output the mode switching signals Vc1 and Vc2 to the multi-mode switching multiplexer 140, to select the mode setting S1 as the output mode setting SC, for setting the receiver 110.

Figure 3:
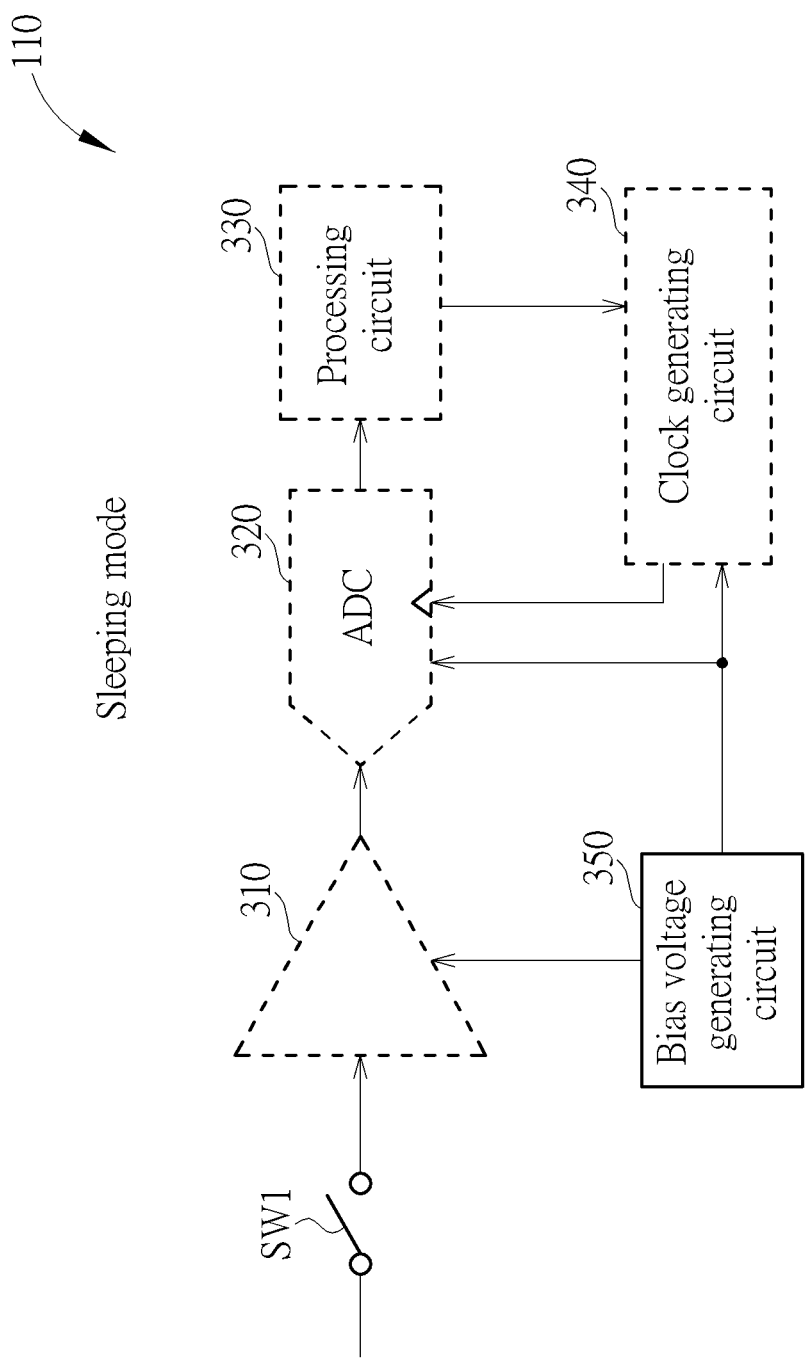
FIG. 3 is a diagram illustrating operations of components within the receiver when the circuitry operates at the sleeping mode.

FIG. 3 is a diagram illustrating operations of components within the receiver 110 when the circuitry 100 operates at the sleeping mode. As shown in FIG. 3, the receiver 110 may include a switch SW1, an equalizer 310, an analog-to-digital converter (ADC) 320, a processing circuit 330, a clock generating circuit 340, and a bias voltage generating circuit 350. Under the control of the mode setting S1, the equalizer 310, the analog-to-digital converter 320, the processing circuit 330, and the clock generating circuit 340 are turned off and stop operating. Since bias voltage generating circuit 350 needs a long time to generate a stable bias voltage after being powered on or woken up, the bias voltage generating circuit 350 will still generate the bias voltage to the equalizer 310, the analog-to-digital converter 320, and the clock generating circuit 340 at the sleeping mode.

In addition, when the circuitry 100 operates at the sleeping mode, the detection circuit 120, the control circuit 130, and the multi-mode switching multiplexer 140 shown in FIG. 1 will still operate normally, to ensure that the subsequent wake-up signal may be received and the mode switching may be performed.

Then, when it is required to wake up the circuitry 100, the transmitting terminals external to the circuitry 100 will transmit a wake-up signal, such as a low frequency periodic signal (LFPS), and the detection circuit 120 will detect the wake-up signal to generate and transmit a detection result to the control circuit 130 for determination. When the control circuit 130 determines the wake-up signal, the control circuit 130 will output the mode switching signals Vc1 and Vc2 to the multi-mode switching multiplexer 140, to select the mode setting S2 as the output mode setting SC, for setting the receiver 110.

Figure 4:
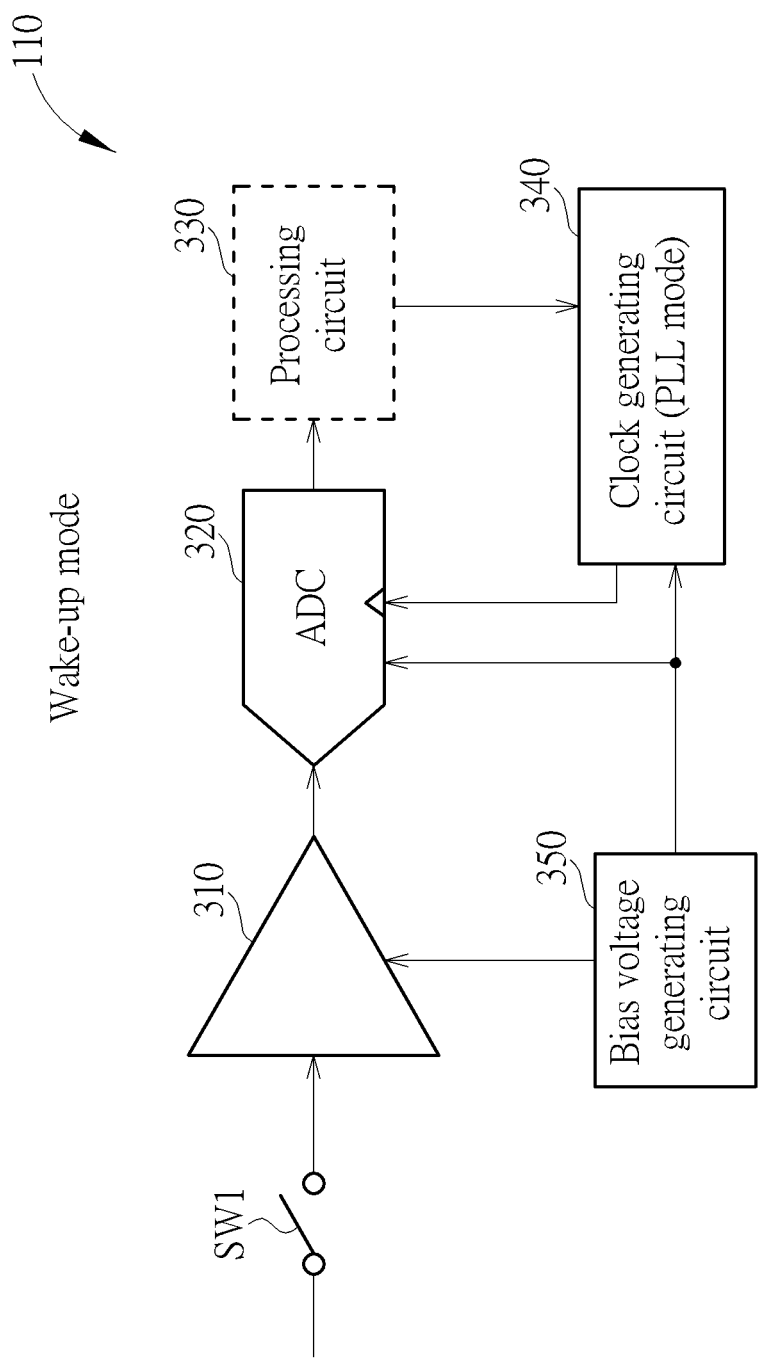
FIG. 4 is a diagram illustrating operations of components within the receiver when the circuitry operates at the wake-up mode.

FIG. 4 is a diagram illustrating operations of components within the receiver 110 when the circuitry 100 operates at the wake-up mode. As shown in FIG. 4, under the control of the mode setting S2, the equalizer 310 and the analog-to-digital converter 320 are turned on and start to operate to establish the bias voltage and the operating point, and the clock generating circuit 340 switches to a phase-locked loop (PLL) mode, to make the clock signal oscillate around the required frequency for the analog-to-digital converter 320. Under the wake-up mode, the receiver 110 has not yet received the external video/audio data.

Figure 5:
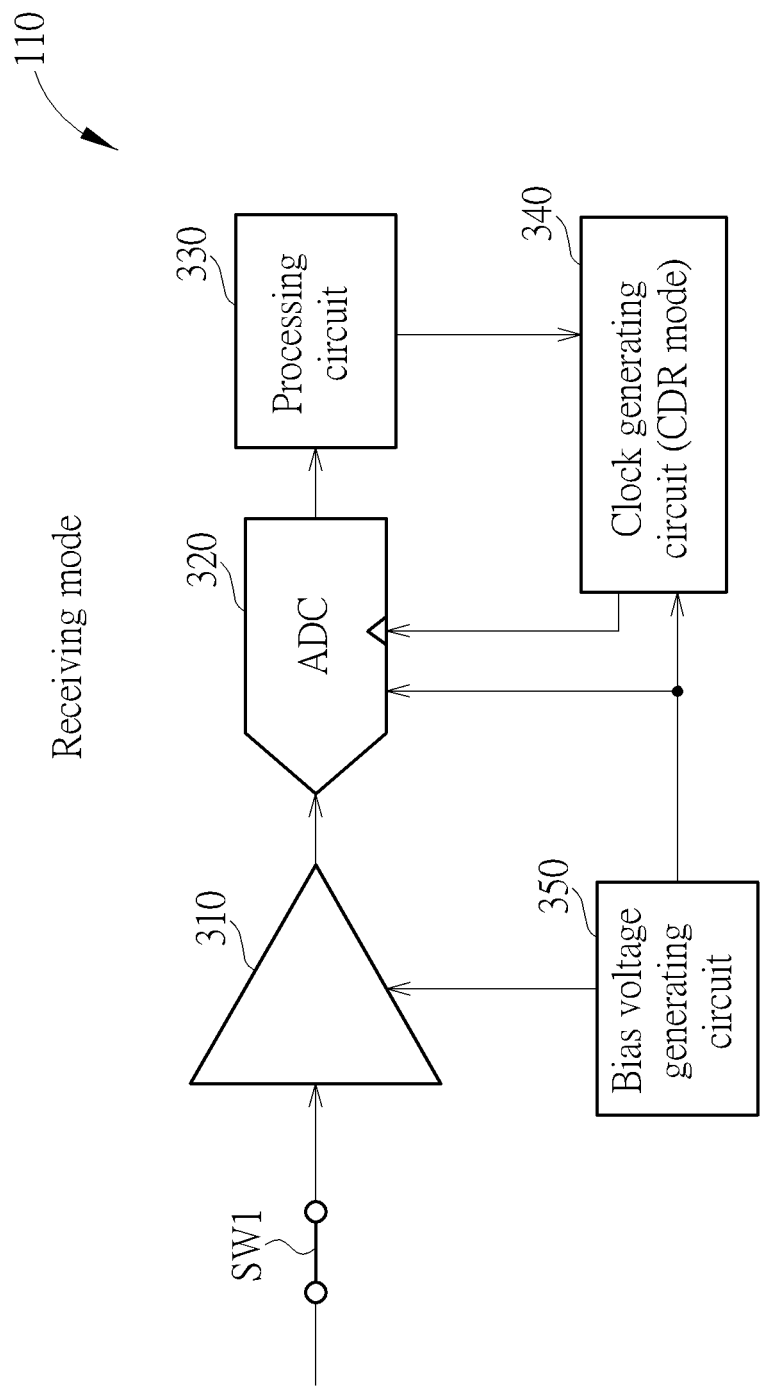
FIG. 5 is a diagram illustrating operations of components within the receiver when the circuitry operates at the receiving mode.

Then, after a period of time since the circuitry 100 enters the wake-up mode, the circuitry 100 prepares to enter the receiving mode, and the control circuit 130 will output the mode switching signals Vc1 and Vc2 to the multi-mode switching multiplexer 140 at this time, to select the mode setting S3 as the output mode setting SC, for setting the receiver 110. FIG. 5 is a diagram illustrating operations of components within the receiver 110 when the circuitry 100 operates at the receiving mode. As shown in FIG. 5, under the control of the mode setting S3, the clock generating circuit 340 operates at a clock and data recovery (CDR) mode, and the receiver 110 starts to operate normally at this time, to receive the external video/audio data. Specifically, the equalizer 310 receives an external input signal (e.g. a video/audio signal) via the switch SW1 to generate an equalized signal. The analog-to-digital converter 320 performs analog-to-digital conversion upon the equalized signal, to generate and transmit a digital signal to the processing circuit 330. The processing circuit 330 may process and transmit the received digital signal to the control circuit 130 or other video/audio processing circuit for subsequent processing. The processing circuit 330 may also transmit the received digital signal to the clock generating circuit 340 for generating the clock signal.

As mentioned above, by the design of the circuitry 100 of the present invention, fast mode switching may be performed when the circuitry 100 is required to switch to any of the sleeping mode, the wake-up mode, and the receiving mode, to address the problem of delay caused by firmware intervention in the prior art.

In this embodiment, the control circuit 130 may be a digital circuit, and the multi-mode switching multiplexer 140 may be an analog circuit. In other embodiments, however, both of the control circuit 130 and the multi-mode switching multiplexer 140 may be implemented by digital circuits.

In summary, in the circuitry of the present invention, by utilizing the multi-mode switching multiplexer to receive multiple mode settings from the firmware at power-on, during the subsequent mode switching, the appropriate mode setting may be generated to the receiver for component settings only through the processing of the hardware, without involving the control of the firmware. As a result, the purpose of fast mode switching can be achieved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A circuitry, comprising:
a multi-mode switching multiplexer, arranged to receive multiple mode settings, and select one of the multiple mode settings as an output mode setting;
a control circuit, arranged to generate a mode switching signal to control the multi-mode switching multiplexer; and
a receiver, arranged to receive an input signal and transmit a received signal to the control circuit, and further arranged to turn on or turn off at least one of its internal components according to the output mode setting;
wherein the multi-mode switching multiplexer receives the multiple mode settings from firmware, and the multiple mode settings are written into receiving terminals of the multi-mode switching multiplexer.

2. The circuitry of claim 1, wherein the multi-mode switching multiplexer receives the multiple mode settings from the firmware when the circuitry is powered on.

3. The circuitry of claim 1, wherein after the multiple mode settings are written into the receiving terminals of the multi-mode switching multiplexer, the multi-mode switching multiplexer does not re-receive the multiple mode settings from the firmware when it is needed to perform mode switching upon the circuitry.

4. The circuitry of claim 1, wherein the control circuit is a digital circuit, the multi-mode switching multiplexer is a digital circuit or an analog circuit, and control of the firmware is not involved in a process in which the control circuit generates the mode switching signal to control the multi-mode switching multiplexer to generate the output mode setting.

5. The circuitry of claim 1, wherein the multiple mode settings comprise a first mode setting, a second mode setting and a third mode setting, and the control circuit generates a first mode switching signal and a second mode switching signal to control the multi-mode switching multiplexer; and the multi-mode switching multiplexer comprises:
a first multiplexer, arranged to receive the first mode setting and the second mode setting, and select one of the first mode setting and the second mode setting as an output of the first multiplexer according to the first mode switching signal; and
a second multiplexer, arranged to receive the third mode setting and the output of the first multiplexer, and select one of the third mode setting and the output of the first multiplexer as the output mode setting according to the second mode switching signal.

6. The circuitry of claim 1, wherein the circuitry supports a Displayport specification.

7. A circuitry, comprising:
a multi-mode switching multiplexer, arranged to receive multiple mode settings, and select one of the multiple mode settings as an output mode setting;
a control circuit, arranged to generate a mode switching signal to control the multi-mode switching multiplexer; and
a receiver, arranged to receive an input signal and transmit a received signal to the control circuit, and further arranged to turn on or turn off at least one of its internal components according to the output mode setting;
wherein the circuitry operates at any of a sleeping mode, a wake-up mode and a receiving mode, and the multiple mode settings comprise a first mode setting corresponding to the sleeping mode, a second mode setting corresponding to the wake-up mode, and a third mode setting corresponding to the receiving mode.

8. A circuitry, comprising:
a multi-mode switching multiplexer, arranged to receive multiple mode settings, and select one of the multiple mode settings as an output mode setting;
a control circuit, arranged to generate a mode switching signal to control the multi-mode switching multiplexer; and
a receiver, arranged to set its internal components according to the output mode setting;
a detection circuit;
wherein the circuitry operates at any of a sleeping mode, a wake-up mode and a receiving mode, and the multiple mode settings comprise a first mode setting corresponding to the sleeping mode, a second mode setting corresponding to the wake-up mode, and a third mode setting corresponding to the receiving mode;
wherein when the receiver receive an input signal, and the control circuit determines that the input signal indicates the sleeping mode, the circuitry operates at the sleeping mode, and the control circuit generates the mode switching signal to control the multi-mode switching multiplexer to select the first mode setting as the output mode setting, for setting the receiver; when the circuitry operates at the sleeping mode, and the detection circuit receives a wake-up signal, the circuitry switches to the wake-up mode, and the control circuit generates the mode switching signal to control the multi-mode switching multiplexer to select the second mode setting as the output mode setting, for setting the receiver;
after a period of time since the circuitry operates at the wake-up mode, the circuitry switches to the receiving mode, and the control circuit generates the mode switching signal to control the multi-mode switching multiplexer to select the third mode setting as the output mode setting, for setting the receiver.

9. The circuitry of claim 8, wherein the internal components of the receiver comprises an equalizer, an analog-to-digital converter, and a clock generating circuit; when the circuitry operates at the sleeping mode, the receiver turns off the equalizer, the analog-to-digital converter and the clock generating circuit according to the first mode setting; when the circuitry operates at the wake-up mode, the receiver turns on the equalizer, the analog-to-digital converter and the clock generating circuit according to the second mode setting, and the clock generating circuit operates at a phase-locked loop mode; when the circuitry operates at the receiving mode, the clock generating circuit operates at a clock and data recovery mode.

* * * * *